Patented June 29, 1943

2,322,870

UNITED STATES PATENT OFFICE 2,322,870

RESIN FROM HALOGENATED HYDRO-
CARBONS AND SIMILAR MATERIALS

Vittorio Molinari, North Plainfield, N. J., assignor
to Bakelite Corporation, New York, N. Y., a
corporation of New Jersey No Drawing. Application March 16, 1940,
Serial No. 324,323

4 Claims. (Cl. 260—67)

This invention relates to a method of preparing condensation products from halogenated aromatic hydrocarbons and halogenated phenyl ethers by reaction with aldehydes, and to the condensation products thereby produced.

It is known that for instance chlorinated naphthalene will react with formaldehyde but, so far as I am aware, only in the presence of a large quantity of a strong acid, for instance concentrated acetic or sulphuric acid. The presence of this large amount of acid renders the process uneconomical as it has to be wasted; also in the case of sulphuric acids and other strong acids which react with the chlorinated naphthalene, the resulting naphthalene product has certain inferior electrical characteristics.

I have discovered that certain halogenated aromatic hydrocarbons and halogenated phenyl ethers may be reacted with aldehydes under the conditions hereinafter described without the necessity of using large quantities of acids and thus I am enabled to quicken and simplify the final production of resins of this type and also produce a product of improved characteristics.

According to this process, I treat substituted halogenated aromatic hydrocarbons or derivatives, for instance chlorinated naphthalene or chlorinated diphenyl or chlorinated diphenyloxide with an aldehyde using only the reactants together with small amounts of certain catalytic materials. The catalysts may be strong inorganic or organic acids and should be of the type which are able to react with the halogenated hydrocarbon. Of the acids, I prefer to use sulphuric acid or a derivative for instance an organic (preferably an aryl) sulphonic acid because of their low cost. The catalyst is also preferably free of metals so that at the end of the process any remaining catalyst may easily be eliminated, for instance by being volatilized or by being decomposed and the decomposition products volatilized. The catalyst should be such and it should be used in such amounts that sufficient remains during the reaction to produce the desired catalytic effect; yet it should be such that it can easily be eliminated after the reaction is complete and if any residue of the catalyst or its decomposition products remain, such residue should not adversely affect the desired characteristics of the resin as would a metal oxide or salt which may be electrically conducting or hygroscopic and absorb sufficient water to render the mass conducting thus destroying or materially decreasing the electrical resistance of the resin which is substantially free from water absorptive components.

The reaction must be conducted in a substantially anhydrous condition, being carried on at such a temperature that any water which is generated by the condensation of the aldehyde with the halogenated hydrocarbon will distill from the mass as soon as formed. The action of the acid catalyst, for instance sulphuric acid, can be explained or interpreted that at the beginning the sulphuric acid will react on the chlorinated hydrocarbons, producing a sulphonic acid derivative. The sulphonic acid produced will react readily with formaldehyde, forming a resin, regenerating the free acid catalyst, in this instance sulphuric acid, and producing water which at the reaction temperature will distill off. The regenerated sulphuric acid will act again on the chlorinated hydrocarbons, and the reaction is repeated over and over again.

The temperature of the reaction is preferably maintained rather high so that the water can, at the given temperature, overcome the water absorptive characteristics of the sulphuric acid or its reaction products. During the reaction the temperature is maintained as explained above, to continuously distill the water formed during the reaction thereby maintaining the sulphuric acid concentrated to the point that it is possible to react with the halogenated hydrocarbons and continue thereafter its sulphonating action. There may, of course, be present the minute quantity of water which the catalyst will not release at the reaction temperature, for instance at 200° C. a mixture of sulphuric acid and water contains only 20% water. Thus, if 4% of sulphuric acid is used as a catalyst, only 0.8% water can be present even assuming that none of the acid has combined with the hydrocarbon. A large part of the sulphuric acid present is probably combined with the hydrocarbon during the reaction and thus the water present will be considerably below even the 0.8%.

As previously stated the reaction should be anhydrous. It is also preferably carried out at atmospheric pressure and it is unnecessary to use either higher or lower pressures but in case a pressure higher than atmospheric is used, arrangements must still be made to remove the water from the reacting mass as soon as it is formed. Thus, if a single reacting vessel is used, the pressure should be less than the pressure of the vapors above the reacting mass corresponding to the temperature of reaction so that the water vapors may come off. This may conveniently be accomplished by the use of a relief valve on the reaction vessel, the valve being regulated to give a pressure below that of the vapors. The relief valve may discharge into a condenser and water collector. The reaction may also occur in a system of connected apparatus starting with the reaction vessel and continuing with a condenser and then connecting with a collecting vessel if desired, the entire system being under pressure. In comparing the formaldehyde reaction of a chlorinated and unchlorinated hydrocarbon, the reaction involving the chlorinated hydrocarbon is more difficult to effect at the temperatures and under the conditions where an unchlorinated hydrocarbon may readily react and thus it is necessary in the case of the chlorinated hydrocarbon to have the reaction substantially anhydrous whereas that may be unnecessary in the case of an unchlorinated hydrocarbon.

While sulphuric acid is believed to be the catalyst, it is preferred to introduce the catalyst into the reaction mixture as a hydrocarbon compound of the nature of the material which is to be formed during the reaction, for instance, it is believed that the sulphuric acid operates catalytically by first reacting with the chlorinated hydrocarbon to form the sulphonic acid of the chlorinated hydrocarbon and this reacts with formaldehyde to regenerate sulphuric acid and unite a plurality of the chlorinated hydrocarbon molecules through a methylene group; and therefore the sulphuric acid is preferably introduced into the reaction mix as a sulphonic acid.

Although the chlorinated hydrocarbon-aldehyde reaction is readily performed, the reaction does not go to absolute completion, and when the chlorinated hydrocarbon refuses to take more aldehyde, there remains a small amount of unreacted chlorinated hydrocarbon. I utilize this to eliminate any free sulphuric acid, the amount of sulphuric acid used as the catalyst preferably being correlated with the other reactants with this end in view. This may be accomplished by holding the reacted mass at a high temperature during which time the sulphuric acid reacts with the chlorinated hydrocarbon remaining from the aldehyde reaction to form sulphonic acid first and then a sulfone. While the sulfone does not have all the desired characteristics of the chlorinated hydrocarbon-aldehyde resin, it is quite stable and the small quantity present eliminates the necessity of neutralizing the sulphuric acid of the catalyst although the reacted mass may, if desired, be treated with a basic substance instead of or in addition to forming the sulfone. Any basic substance may be used so far as neutralizing acidity is concerned but in order to obtain a final product with the best characteristics it should be a material, for instance calcium oxide, which forms a non-hygroscopic and electrically non-conducting product.

Purification of the final product is unnecessary where the reactants are pure. However, technical grades of chlorinated hydrocarbons frequently contain quantities of more highly chlorinated hydrocarbons, for instance technical monochlornaphthalene may contain dichlornaphthalene and even small amounts of tri and tetrachlornaphthalene. It is therefore desirable in case technical grades of reactants are used, to purify the resin after the reactions are complete. Using only catalytic amounts of sulphuric acid, the reaction is apparently quite selective and a fair purification may be obtained by holding the reaction mass at an elevated temperature, for instance from 250° C. to 300° C. Both the holding time and temperature may be reduced by the use of a vacuum above the resin. However, the judicious use of a vapor, for instance steam, in conjunction with vacuum is greatly preferred. A high temperature for the steam and for the mass undergoing purification and a low absolute pressure should be used. Steam distillation is preferred above other methods of purification as the hot water-vapor appears to attack and break down and remove any materials present in the reacted mass which are subject to decomposition by water even though the reacted mass and the steam are not above the reaction temperature of the chlorinated hydrocarbon-aldehyde reaction. Thus such materials are removed before the resin is used in the arts and they do not lie dormant in the resin ready to absorb moisture and cause deterioration of the resin at a future time. Thus the heat, vacuum, steam and agitation of the mass caused by the steam as well as the chemical and physical effect of the steam in pulling impurities out of the mass leave a final product which is quite pure.

During my work in connection with this invention, I have discovered this reaction is most effective in the treatment of halogenated materials containing two or more rings (including a condensed ring as one of the rings) and containing only one atom of halogen substituted for hydrogen on the ring of the hydrocarbon molecule, for instance mono halogenated naphthalene, mono halogenated diphenyl, mono halogenated diphenyloxide, as well as others hereinafter noted.

In order further to illustrate the nature of this invention, the following examples are given which, however, must be understood to be merely illustrative and in no sense limiting the invention specifically thereto:

*Example 1.*—Approximately 100 parts by weight of monochlornaphthalene and 4 parts of benzene sulphonic acid are heated to between 140 and 250° C. While keeping the material at this temperature and stirring, approximately 20 parts of paraform are added, preferably in small portions allowing the reaction to subside after each addition of paraform before the next portion is added. The reaction occurs at atmospheric pressure and may be somewhat accelerated or retarded depending upon whether the temperature is above or below 160° C. which is the melting point of paraform. At about the time that the last portion of paraform is added, paraform will collect in a condenser which may be connected to the reaction vessel, the amount of collected paraform depending somewhat on the amount of impurities originally present in the monochlornaphthalene. Substantially no reaction will occur if the mix is not heated to 140° C. as this appears to be a somewhat critical point when using the acids or other materials in catalytic amounts as distinguished from a reaction wherein large amounts of dehydrating agents are used even though those agents may be materials, for instance sulphuric acid, which are catalysts.

When the reaction is complete the temperature may be and preferably is raised to a maximum of about 270° C. although considerably lower temperatures, for instance about 160° C. may be used. There is such a small amount of sulphuric acid catalyst present in this instance (only about 2 to 2.25 parts of sulphuric acid resulting from the 4 parts of benzene sulphonic acid used) that it has an opportunity to react with the excess of the chlornaphthalene forming a sulfone at the end of the aldehyde reaction due to the high temperature. Pressure may be lowered to about 3 inches of mercury absolute pressure (particularly if the low temperature is used) and steam is passed through the mass which removes or assists in removing the majority of the unreacted material or other impurities or at least reducing their quantity to such a minimum that they do not materially affect the chlornaphthalene formaldehyde resin. The resulting resin is quite brittle, of the remeltable type, non-heat hardenable and non-inflammable. The melting point of the resin will be up to 190° F. and may be as high as 230° F. depending upon the thoroughness of purification and the purity of the original chlorinated naphthalene, thus enormously raising the liquefying point of the starting material. The dielectric power factor of a sample of material made in a factory run was below .0015 at frequencies from 5000 cycles to approximately 50,000,000 cycles per second with a dielectric power factor of only .0007 at approximately 1,000,000 cycles per second and the dielectric loss factor was below .005 over the same frequency range with a loss factor of only .0021 at approximately 1,000,000 cycles per second. Thus the resin is highly useful as a dielectric in the upper audio frequency range and through the high frequency range. If a sample of the resin be held at a high temperature and vacuum for a period of time, for instance 300° C. at 3 m. m. absolute pressure for 3 hours, the dielectric power factor and dielectric loss factor are further decreased. A sample of such a resin gave a dielectric power factor below .0015 at frequencies from 200 cycles to approximately 50,000,000 cycles per second and a dielectric power factor below 0.0006 at frequencies from 5,000 cycles to approximately 50,000,000 cycles per second with a dielectric power factor of only .0002 at approximately 1,000,000 cycles per second. The dielectric loss factor of the sample was below 0.002 at frequencies from 5,000 cycles to approximately 50,000,000 cycles per second and below 0.005 at frequencies from 125 cycles per second to approximately 50,000,000 cycles per second with a loss factor of only .0006 at approximately 1,000,000 cycles per second.

*Example 2.*—1,000 parts (by weight) of parachlordiphenyl and 18 parts of concentrated sulphuric acid were heated to 200° C. for 20 minutes. This sulfonates the chlordiphenyl. The temperature was then held between 220° C. and 230° C. and formaldehyde gas led into the mass at a rate just sufficient to be combined. During the reaction water distilled off. The reaction was continued for a total time between 5 and 6 hours and was stopped when paraformaldehyde collected in a condenser attached to the reaction vessel. The reaction is slower than in the case of monochlornaphthalene and the preferred temperature range for the reaction is between 180° C. and 250° C. The sulphuric acid was neutralized with calcium hydrate and the mass steam distilled at about 300° C. until no more oil distilled off. The preferred temperature range for purification is between 220° C. and 320° C. The resin obtained was brittle with a metallic sound when struck, non-inflammable, and very soluble in China-wood oil, more so than the monochlornaphthalene resin. Flame resistant varnishes and other coating materials may be made using these resins.

*Example 3.*—1,000 parts (by weight) of monochlordiphenyl oxide and 18 parts of concentrated sulphuric acid were heated to 220° C. to permit sulfonation of the chlordiphenyl oxide. Dry formaldehyde gas was then introduced as in Example 2. The reaction was completed in approximately 4 hours. The mass was neutralized with lime and steam distilled as in Example 2. The preferred temperature range of the reaction is 210° C. to 270° C. and preferred purification range is between 220° C. and 320° C. The resulting resin was brittle, non-inflammable and soluble in China-wood oil.

The aldehydes which may be used in this process and product are either aromatic or aliphatic aldehydes which can exist in the anhydrous state and are stable in the vapor form, for instance acetaldehyde, crotonic aldehyde, benzaldehyde, as well as formaldehyde and paraformaldehyde. As indicated in the examples the aldehydes may be introduced into the reaction mass in the solid, liquid or vapor state.

The halogenated aromatic hydrocarbons and halogenated phenyl ethers which may be used include halogenated benzol, toluene, naphthalene, diphenyl, diphenyl oxide, phenanthrene, anthracene, fluoranthene, hydrindene, pyrene, chrysene, diphenyl sulphone, etc. Of the halogens, chlorine is preferred because of its low cost and the prevalence of chlorinated hydrocarbons and derivatives on the raw material market; however, the other halogens may be used.

The catalysts which may be used are as previously stated, namely strong organic or inorganic acids (those which can give a pH up to 4 in water solution) of the type which are able to react with the halogenated cyclic carbon compounds or derivatives of such acids which will so react. Acids or derivatives containing metals are not preferred, however, where the resin will ultimately be used for electrical insulating purposes. Sulphuric acid or sulphonic acids are preferred because of their satisfactory reactions and their low cost.

In purifying the resins they may be heated to a point just under their decomposition temperatures but much lower temperatures may be used. It is preferred to purify at a temperature well below the decomposition point and use steam and vacuum to facilitate the withdrawal of impurities and unreacted ingredients. The final resin is thus quite pure and is obtained without the necessity of removing large quantities of acetic or sulphuric acids or other solvents or dehydrating agents.

The resins produced in accordance with this invention are characterized by stability to heat even though they are thermoplastic and can be heated to above 350° C. without substantial decomposition or carbonization, are flame retardant and non-inflammable, are soluble in China-wood oil and can be used in the preparation of flame resistant varnishes and other coating materials, are miscible with other resins for instance the styrene, vinyl, phenol-formaldehyde oil soluble resins, and have good electrical properties.

What is claimed is:

1. Process of forming a resin which comprises condensing in a substantially anhydrous condition, a member of the group consisting of halogen-substituted aromatic hydrocarbons and halogen-substituted phenyl ethers, with an aldehyde reactive therewith, in the presence of only small catalytic amounts of a member of the group consisting of sulphuric acid and aromatic sulphonic acids reactive with a member of said first mentioned group, the aldehyde being free of other functional groups which would prevent the resin-forming reaction.

2. Process of forming a resin which comprises condensing under heat and in a substantially anhydrous condition, a member of the group consisting of halogen-substituted aromatic hydrocarbons and halogen-substituted phenyl ethers, with an aldehyde reactive therewith, in the presence of only small catalytic amounts of a member of the group consisting of sulphuric acid and aromatic sulphonic acids reactive with a member of said first mentioned group, the aldehyde being free of other functional groups which would prevent the resin-forming reaction, and eliminating remaining free sulphuric acid by continuing the heating to react the acid with any of the remaining member of said first mentioned group.

3. Process of forming a resin which comprises heating together at a temperature higher than 140° C. in a substantially anhydrous condition, a member of the group consisting of halogen-substituted arcmatic hydrocarbons and halogen-substituted phenyl ethers, with an aldehyde reactive therewith and only small catalytic amounts of a member of the group consisting of sulphuric acid and aromatic sulphonic acids reactive with members of said first mentioned group, the temperature being sufficiently high to drive off water from the reacting mass as soon as it is formed, the aldehyde being free of other functional groups which would prevent the resin-forming reaction.

4. Process of forming a resin which comprises condensing in a substantially anhydrous condition, a member of the group consisting of halogen-substituted aromatic hydrocarbons and halogen-substituted phenyl ethers, with an aldehyde reactive therewith, in the presence of less than one-tenth mol. of catalyst per mol. of the member of said group, the catalyst being a member of the group consisting of sulphuric acid and aromatic sulphonic acids reactive with a member of said first mentioned group, the aldehyde being free of other functional groups which would prevent the resin-forming reaction.

VITTORIO MOLINARI.